United States Patent [19]

Olnowich et al.

[11] Patent Number: 5,408,646

[45] Date of Patent: Apr. 18, 1995

[54] MULTIPATH TORUS SWITCHING APPARATUS

[75] Inventors: Howard T. Olnowich, Endwell; Arthur R. Williams, Croton-on-Husdon, both of N.Y.

[73] Assignee: International Business Machines Corp., Armonk, N.Y.

[21] Appl. No.: 946,203

[22] Filed: Sep. 17, 1992

Related U.S. Application Data

[63] Continuation-in-part of Ser. No. 677,543, Mar. 29, 1991, and a continuation-in-part of Ser. No. 794,497, Nov. 27, 1991, and a continuation-in-part of Ser. No. 799,602, Nov. 27, 1991.

[51] Int. Cl.$^6$ ................................................ H04J 3/26
[52] U.S. Cl. ...................................... 395/575; 395/200
[58] Field of Search .............................. 395/575, 200; 364/342.6, 229.5; 370/60, 85.12, 94.1

[56] References Cited

U.S. PATENT DOCUMENTS

| | | | |
|---|---|---|---|
| 4,933,933 | 6/1990 | Dally et al. | 370/60 |
| 4,965,788 | 10/1990 | Newman . | |
| 5,105,424 | 4/1992 | Flaig et al. | 370/94.1 |
| 5,181,017 | 1/1993 | Frey, Jr. et al. | 340/825.02 |
| 5,218,676 | 6/1993 | Ben-Ayed et al. | 395/200 |

OTHER PUBLICATIONS

*Computer Architecture and Organization* Second Edition by John P. Hayes ©1988 by McGraw-Hill Inc. pp. 491-497.

IBM TDB vol. 33, No. 5, Oct., 1990, "Asynchronous Digital Video Switching System", by Farrell et al, pp. 227-233.

*Primary Examiner*—Vincent P. Canney
*Attorney, Agent, or Firm*—Eugene I. Shkurko; Pryor A. Garnett

[57] ABSTRACT

Disclosed is a new torus switch with low latency performance improves torus network connection time by trying multipaths in one single high speed operation. This multipath approach can be directed at establishing a connection between two specific nodes over various alternate routes simultaneously. If only one route is available, the multipath approach will find that path instantaneously and establish the desired connection with minimal latency. If several links are available, the multipath method establishes the desired connection over only one of the available links and leaves the other options free to be used by other connections. In addition, routing at intermediate torus network stages improves over the wormhole approach.

9 Claims, 8 Drawing Sheets

FIG.8

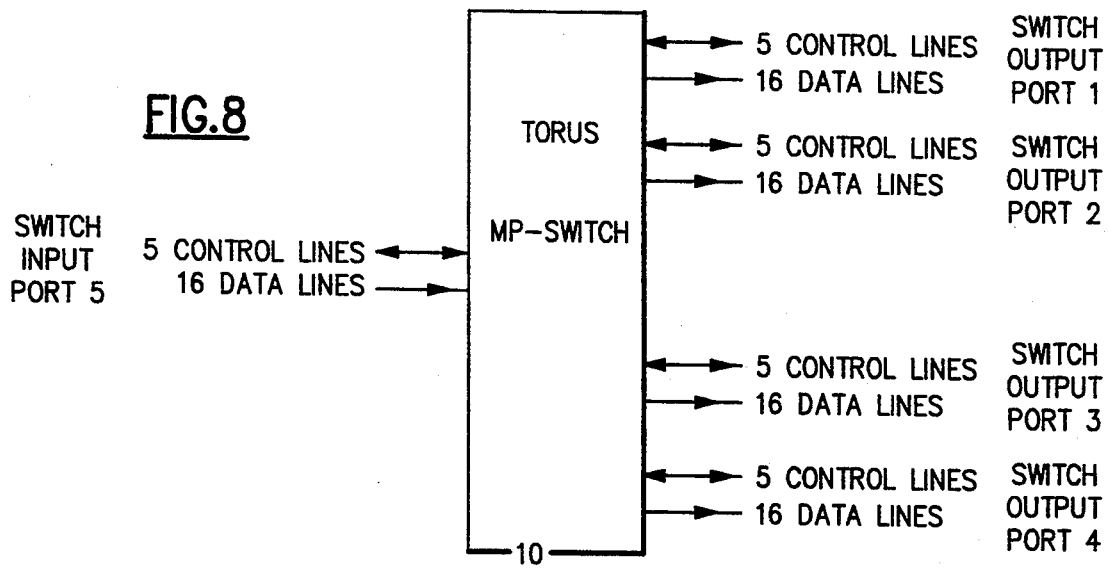

MULTIPATH SELECTION CONTROL

| INCOMING CNTL LINES | | STAGE 1 SELECTIONS | | STAGE 2 SELECTIONS | | STAGE 3 SELECTIONS | | STAGE 4 SELECTIONS | |
|---|---|---|---|---|---|---|---|---|---|
| PATH 1 SELECTION CONTROL FIELD | DATA 00 | 1 | SELECTS OUTPUT PORT 1 | 0 | SELECTS OUTPUT PORT 2 | 0 | SELECTS OUTPUT PORT 5 | 0 | END OF PATH |
| | DATA 01 | 0 | | 1 | | 1 | | 0 | |
| | DATA 02 | 0 | | 0 | | 0 | | 0 | |
| | DATA 03 | 0 | | 0 | | 0 | | 0 | |
| | PATH CONTROL 0 | X | | 0 | | 0 | | 0 | |
| | PATH CONTROL 1 | X | | 0 | | 0 | | 0 | |
| PATH 2 SELECTION CONTROL FIELD | DATA 04 | 0 | SELECTS OUTPUT PORT 3 | 0 | SELECTS OUTPUT PORT 5 | 0 | END OF PATH | 0 | END OF PATH |
| | DATA 05 | 0 | | 0 | | 0 | | 0 | |
| | DATA 06 | 1 | | 1 | | 0 | | 0 | |
| | DATA 07 | 0 | | 0 | | 0 | | 0 | |
| | PATH CONTROL 0 | X | | 0 | | 0 | | 0 | |
| | PATH CONTROL 1 | X | | 1 | | 1 | | 1 | |
| PATH 3 SELECTION CONTROL FIELD | DATA 08 | 0 | SELECTS OUTPUT PORT 2 | 0 | SELECTS OUTPUT PORT 3 | 1 | SELECTS OUTPUT PORT 1 | 0 | SELECTS OUTPUT PORT 5 |
| | DATA 09 | 1 | | 0 | | 0 | | 0 | |
| | DATA 10 | 0 | | 1 | | 0 | | 0 | |
| | DATA 11 | 0 | | 0 | | 0 | | 1 | |
| | PATH CONTROL 0 | X | | 1 | | 1 | | 1 | |
| | PATH CONTROL 1 | X | | 0 | | 0 | | 0 | |
| PATH 4 SELECTION CONTROL FIELD | DATA 12 | 0 | SELECTS OUTPUT PORT 4 | 0 | SELECTS OUTPUT PORT 2 | 0 | SELECTS OUTPUT PORT 5 | 0 | END OF PATH |
| | DATA 13 | 0 | | 1 | | 0 | | 0 | |
| | DATA 14 | 0 | | 0 | | 1 | | 0 | |
| | DATA 15 | 1 | | 0 | | 0 | | 0 | |
| | PATH CONTROL 0 | X | | 1 | | | | 1 | |
| | PATH CONTROL 1 | X | | 1 | | | | 1 | |

MULTIPATH TORUS SWITCHING APPARATUS

RELATED APPLICATIONS

The present United States patent application claims priority as a continuation-in-part application and is related to the following applications:

U.S. Ser. No. 07/677,543, filed Mar. 29, 1991, entitled "All-Node Switch, An Unclocked, Unbuffered Asynchronous Switching Apparatus", by P. A. Franaszek et al., and U.S. Ser. No. 07/799,497, Filed Nov. 27, 1991, entitled "Multi-Function Network" by H. T. Olnowich, et al. and U.S. Ser. No. 07/799,602, Filed Nov. 27, 1991, entitled "Multi-Media Serial Line Switching Adapter for Parallel Networks and Heterogenous and Homologous Computer Systems", by H. T. Olnowich, et al.

The present application is also related to the following applications filed concurrently herewith:

U.S. Ser. No. 07/947,196, filed Sep. 17, 1992, entitled "Multi-Media Analog/Digital/Optical Switching Apparatus", by H. T. Olnowich et al, and, U.S. Ser. No. 07/946,204, filed Sep. 17, 1992, entitled "Switch-Based MicroChannel Planar Apparatus" by H. T. Olnowich et al, and, U.S. Ser. No. 07/946,512, filed Sep. 17, 1992, entitled "Switch-Based Personal Computer Interconnection Apparatus" by H. T. Olnowich et al, and, U.S. Ser. No. 07/947,644, filed Sep. 17, 1992, entitled "Slave MicroChannel Apparatus for Converting to Switch Architecture" by H. T. Olnowich et al, and, U.S. Ser. No. 07/946,506, filed Sep. 17, 1992, entitled "Master MicroChannel Apparatus for Converting to Switch Architecture" by H. T. Olnowich et al, and, U.S. Ser. No. 07/946,513, filed Sep. 17, 1992, entitled "Variable Cyclic Redundancy Coding Method and Apparatus" by H. T. Olnowich et al, and, U.S. Ser. No. 07/947,010, filed Sep. 17, 1992, entitled "Signal Regeneration Apparatus for Multi-Stage Transmissions", by H. T. Olnowich et al, and, U.S. Ser. No. 07/947,023, filed Sep. 17, 1992, now issued as U.S. Pat. No. 5,345,229, entitled "Adaptive Switching Apparatus for Multi-Stage Networks", by H. T. Olnowich et al, and, U.S. Ser. No. 07/946,986, filed Sep. 17, 1992, entitled "Priority Interrupt Switching Apparatus for Real Time Systems", by H. T. Olnowich et al, and, U.S. Ser. No. 07/946,509, filed Sep. 17, 1992, entitled "Message Header Generation Apparatus for Parallel Systems" inventors H. T. Olnowich et al.

These applications and the present application are owned by one and the same assignee, International Business Machines Corporation of Armonk, N.Y.

The descriptions set forth in the previous applications and the concurrently filed applications are incorporated by reference.

FIELD OF THE INVENTION

The present invention relates to digital computer systems comprised of several or many computing and/or input/output elements, and the ability of the said individual elements to perform high speed, low-latency communications with each other in a parallel fashion over a torus interconnection network.

GLOSSARY OF TERMS

Data Message A format for sending information between nodes of a parallel system incorporating the further ability to check the said information for accuracy using cyclic redundancy coding methods.

Data Another term for Data Message

Equi-distant Network A network where the communication distance between any two nodes is a constant number of switch stages.

Idle The state of a switch interface where it is not presently involved in the process of connecting two nodes.

Message Another term for Data Message

Multipath When there is more than one path between two nodes through a switch network.

Node A functional element of the system comprised of one or more processors interconnected by a torus network.

Nodal element Another term for node, which has the same meaning.

NRZ Abbreviation for non-return to zero.

Path length The number of switch stages traversed to get from one node to another.

Port A single bi-directional entry and exit point to a switching network.

Receiving Node A functional element which is receiving data transmitted over a torus network.

Sending Node A functional element which is transmitting data over a torus network.

Winning Path When there is more than one path between two nodes through a switch network, the winning path is the single path which makes the connection.

Word 16-bits of data, 2 byte entities.

Wormhole A message routing scheme through a network, where the message resembles a worm burrowing through the network without interrupting the local node processors connected to intermediate switch stages.

BACKGROUND OF THE INVENTION

Parallel computing systems consist of a plurality of processors that communicate via an interconnection network. One popular network for providing the interconnection for a plurality of processors is the torus network.

Torus switches and networks are described by William J. Dally in his paper "Performance Analysis of k-ary N-cube Interconnection networks" published in the IEEE "Transactions on Computers"; Vol. 39 #6, June 1990, pg 775. Torus switches have interesting characteristics for providing the interconnection media for parallel processing elements, but their performance is very poor requiring usually in the order of 50 microseconds to establish a connection link between any two nodes of the parallel system. The connection times required in the modern parallel arena is in the order of nanoseconds, not microseconds.

The torus switch has interesting characteristics, such as the ability to avoid the necessity for a centralized switching element. The torus can be completely distributed such that all portions of the switching element associated with a given node can physically reside at the node. This gives both excellent fault tolerant and modular expansion capabilities. Therefore, it is a meaningful goal to try overcome the deficiencies of present torus implementations for the purpose of providing a powerful modern switching apparatus.

Many state-of-the-art switch solutions do not provide the switching network characteristics and low-latency concepts required for modern interconnect systems. The characteristics that are required include the ability to dynamically and quickly establish and break element interconnection, to do it cheaply and easily in one chip, to have expandablity to many thousands of elements, to permit any length, non-calibrated interconnection wire lengths, to solve the distributed clocking problems and allow future frequency increases, and to permit parallel establishment and data transmittal over N switching paths simultaneously.

One switch which does provide the distributed and fully parallel interconnect properties required by modern parallel systems is the ALLNODE Switch (Asynchronous, Low Latency, inter-NODE switch), which is disclosed in U.S. Ser. No. 07/677,543. The Allnode switch as disclosed in U.S. Ser. No. 07/677,543 is a multistage network switch which is not directly applicable to the torus network. The Allnode switch approach is applied to the torus switch in the present invention to bring the low latency and high bandwidth concepts to the torus network. The ALLNODE switch provides a circuit switching capability at high bandwidths, and includes distributed switch path connection set-up and tear-down controls individually within each switch—thus providing parallel set-up, low latency, and elimination of central point failures. We will further describe in the detailed description the adaption of the ALLNODE switch as the parent disclosure to the present invention.

In research report No. AAA92A000704, IBM Research in San Jose, Calif. reported on "A Theory of Wormhole Routing in Parallel Computers" by P. Raghavan and E. Upfal in December, 1991. Raghavan and Upfal claim the the current trend in multicomputer architecture and torus networks is to use wormhole routing. In wormhole routing a message is transmitted as a continuous stream of bits, physically occupying a sequence of nodes/edges in the network. Thus, a message resembles a worm burrowing through the network without interrupting the local node processors. Theoretical analyses of simple wormhole routing algorithms have shown them to be nearly optimal for torus networks. We will further describe in the detailed description the adaption of the present invention to wormhole routing for optimal transfers.

Pin count providing input/output connection to a functional design is always a fundamental constraint when it comes to packaging switches on real chips. The signal pin count for the disclosed torus is (w+c) *(2*D+1)* 2, where w is the width of the data path, c is the number of control lines, and D is the dimensionality of the switch. It can be seen from the equation that for a given number of available pins, the local connectivity of the chip (expressed by the width of the data path (w) can be varied in regards to the dimensionality of the switch (D) to provide various other switch options. The most notable work in this field was performed by William J. Dally in his paper "Performance Analysis of k-ary N-cube Interconnection networks" published in the IEEE "Transactions on Computers"; Vol. 39 #6, June 1990, pg 775. This is the fundamental paper that took parallel computers from hypercubes (high D, low w) to two-dimensional toruses (low D, high w). It was Dally's PhD research for Chuck Seitz that led Intel to select the torus for use in its parallel machines; however, Intel's torus switches are high latency solutions that require orders of magnitude more set-up time than proposed by the apparatus and approach in this disclosure.

An interesting approach for improving the performance of a circuit switched network is the ability to try multiple paths of a network simultaneously, and to allow the first path to reach the destination to be the winner. This concept was pioneered by Joel Gould et al. for the torus switch and given the name of "Flash-Flooding" in IBM Docket No. SA889-042. A variation of the flash-flooding concept called multipath transmission is applied in this disclosure which is different from the original "Flash-Flooding" concept. "Flash-Flooding" decisions require intelligence in tile individual torus switching units and cause additional overhead and latency; whereas, the multipath decisions of the present invention are made by the sending node and do not require additional intelligence, overhead, or latency at each individual torus switching unit.

SUMMARY OF THE INVENTION

The invention is a new torus switch to comprise improved performance torus networks. The new torus switch is a modification of the high speed and low latency switch interconnection techniques disclosed in the parent application, the ALLNODE Switch (Asynchronous, Low Latency, inter-NODE switch), which is disclosed in U.S. Ser. No. 07/677,543. The present invention techniques will bring 40 ns or less connection set-up and tear down latencies to the torus switch organization, by using the concepts of asynchronous and unbuffered, byte-wide links. In addition, rerouting at intermediate stages will be a vast improvement of the wormhole approach, so as to provide extremely low rerouting latencies of 40 ns or less per stage.

The present invention also improves the torus connections by providing the capability to establish multiple connections in one single high speed operation: This Multipath approach can be directed at establishing a connection between two specific nodes over various alternate routes simultaneously. The invention is such that if only one route is available, the multipath approach will find that path instantaneously and establish the desired connection with minimal latency, If several links are available (presently unused) as connection options, the multipath method establishes the desired connection over only one of the available links and leaves the other options free to be used by other connections. If all the multipaths are not available, the multipath approach establishes no connection and informs the sender that the operation will have to be retried until a connection link becomes available. This type of multipath approach is directed a further improving the latency and performance of the torus switch.

The present invention is primarily applicable to message passing parallel systems interconnected by a fully parallel switching means. The preferred switching means is the basic digital asynchronous and unbuffered switching concept disclosed in U.S. Ser. No. 07/677,543, "All-Node Switch, An Unclocked, Unbuffered Asychronous Switching Apparatus" by H. T. Olnowich et al. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves.

BRIEF DESCRIPTION OF THE DRAWINGS

FIG. 8 illustrates a typical routing example for routing data messages using a multipath approach from a sending node through 4 lotus switch stages to a receiving node.

DETAILED DESCRIPTION OF THE PREFERRED METHOD and EMBODIMENT

Figure 1:
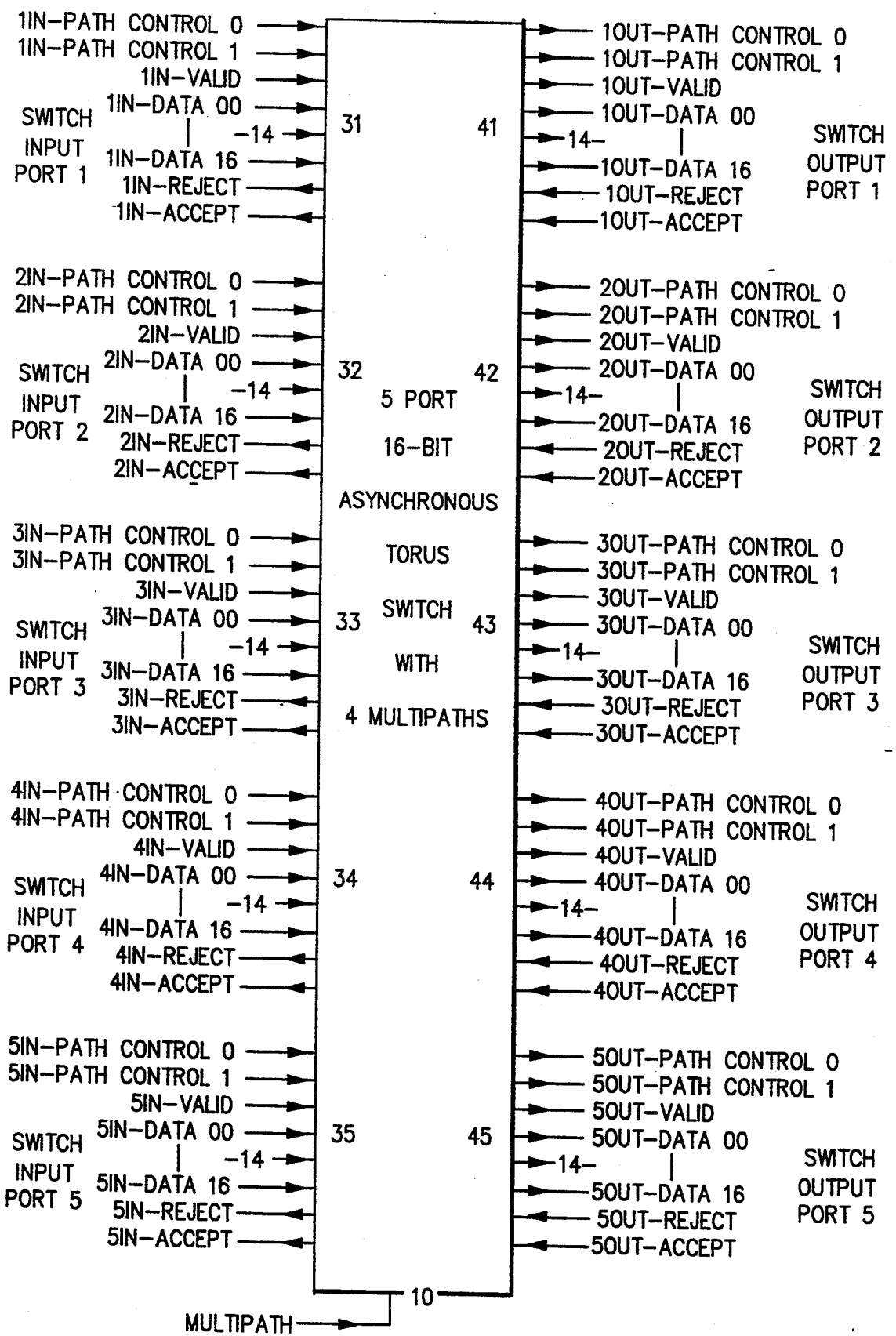
FIG. 1 illustrates generally our preferred multipath asynchronous torus switching apparatus and the interface required to implement a 2 dimensional torus network via 5 input and 5 output ports per switch.
Figure 2:
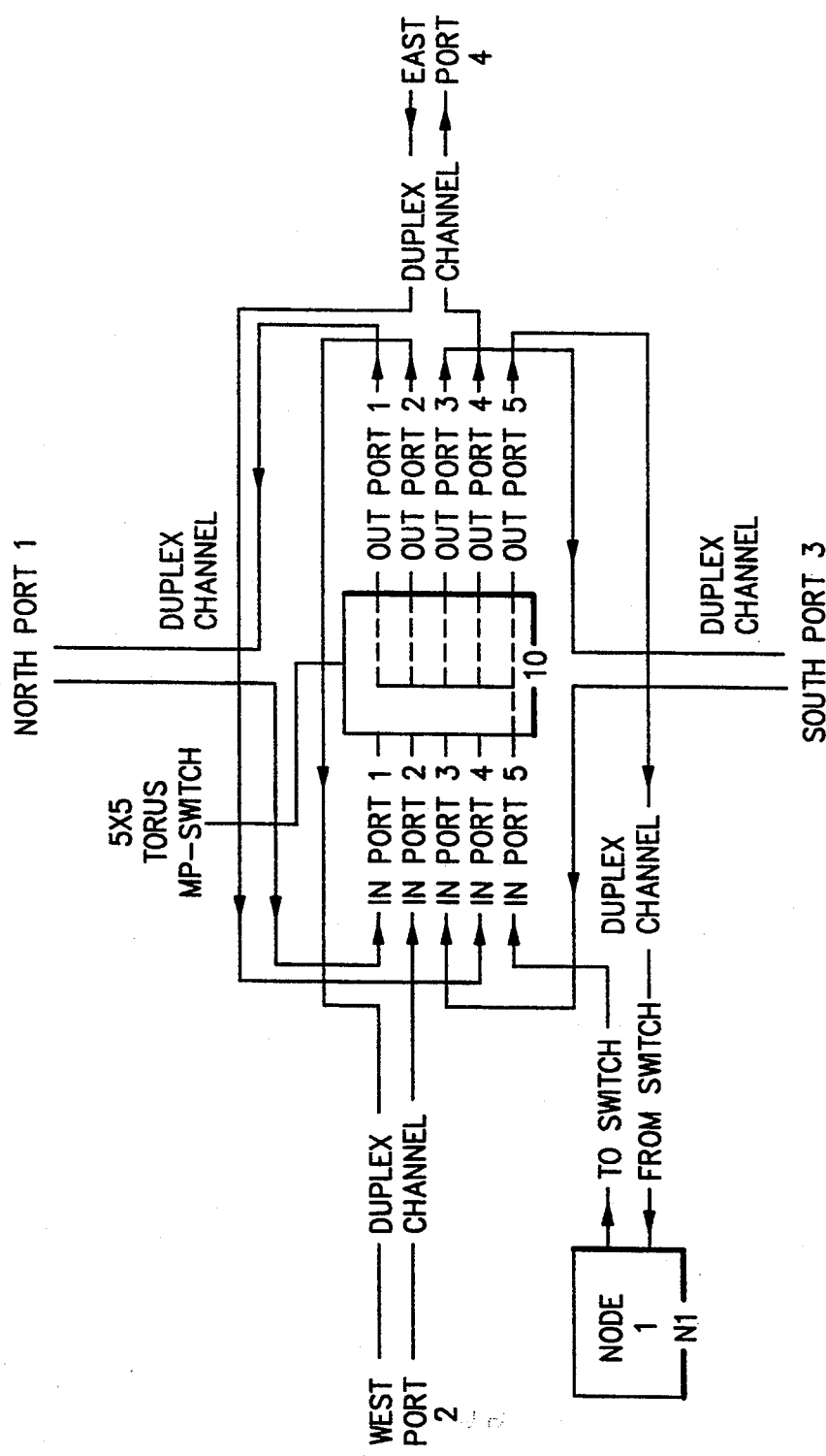
FIG. 2 illustrates generally the preferred connections to the multipath torus switching apparatus which permit it the function in full duplex mode.

The preferred embodiment of the Multipath, Asynchronous, Torus Switch (MP-SWITCH) is shown in FIG. 1. MP-Switch 1A is a 2-dimensional (2D) torus having 5 unidirectional input ports and 5 unidirectional output ports. These ports are used in pairs as shown in FIG. 2 to provide a full duplex channel capability over each of the 5 ports, with each duplex port supporting 1 unidirectional interface comprised of 16 data lines plus 5 controls lines going to the switch 10 and 1 unidirectional interface comprised of 16 data lines plus 5 controls lines coming from the switch 10. FIG. 2 also shows the 2D nature of the torus switch, where the 2D means the x-direction and the y-direction with the west port 2 of the switch going in the minus x-direction, the east port 4 going in the plus x-direction, the south port 3 of the switch going in the minus y-direction, and the north port 1 going in the plus y-direction.

Each of the 5 input and 5 output ports are used to transfer 16 bits at a time at a 50 MHZ rate and thus yielding a 100 MBS rate per link. The MP-Switch is capable of supporting 5 links simultaneously, for a combined rate of 0.5 GBS per switch. The 5 control lines associated with every switch port are defined as follows:

VALID: When active, indicates that a message is in the process of being transmitted. When inactive, indicates a RESET command and causes all switches to reset to the IDLE state.

PATH CONTROL 0 & 1: Indicate which of 4 sets of routing controls are being used in regards to a specific path to set-up a connection link between nodes.

REJECT: Signal flow is in the opposite direction from the data signals. It indicates that a REJECT condition has been detected and that a connection was not established or the message was not successfully transmitted.

ACCEPT: Signal flow is in the same direction as the REJECT signal and opposite to that of the data signals. It provides a positive acknowledgement that the message has been transmitted successfully.

The number of pins required to provide input/output connections to the switch design is always a fundamental constraint when it comes to packaging switches on real chips. The signal pin count for the disclosed torus is $(w+c)*(2*D+1)*2$, where w is the width of the data path, c is the number of control lines, and D is the dimensionality of the switch. For the preferred embodiment the pin count$=(16+4)*(2*2+1)*2=200$ pins. This is a reasonable number of signal pins and the basis on which the 5×5×16 (5 input ports×5 output ports×16-bit data width) torus size was selected as the preferred embodiment.

Figure 3:
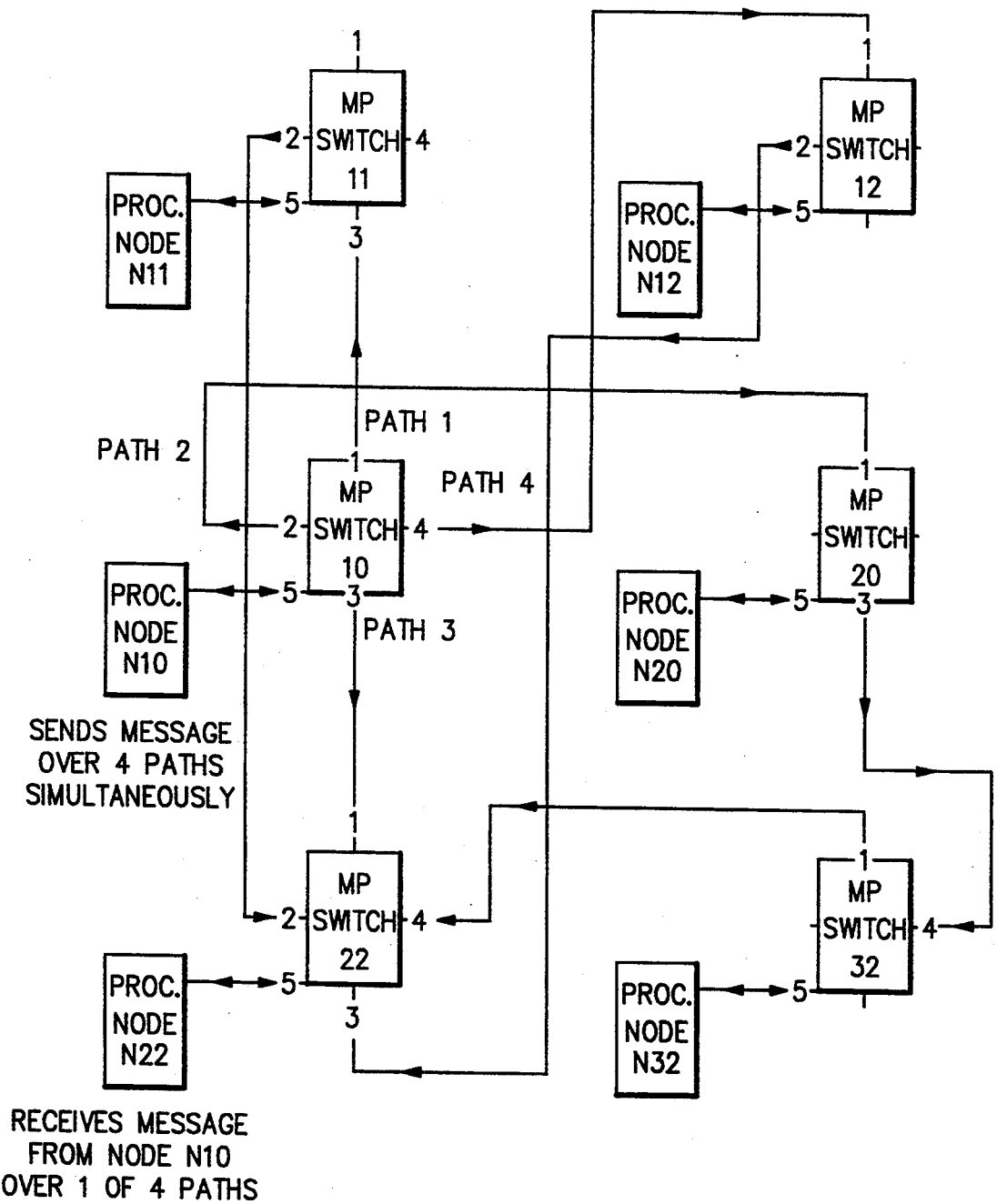
FIG. 3 illustrates generally our preferred embodiment of a parallel system comprised of multiple nodes interconnected by the present invention.

FIG. 3 shows the typical interconnection of the MP-Switch connecting a plurality of nodes as a 2D torus network. The Torus MP-Switch disclosed supports a multipath option, which can be understood by considering an example of trying to establish a connection between nodes 10 and 22 using the present invention multipath approach. Node 10 attempts to connect to node 22 over 4 multipaths simultaneously for the purpose of transmitting a message to node 22. The 4 paths tried are as follows:

PATH 1—Node 10 to MP-Switch 10, MP-Switch 10 to MP-Switch 11, MP-Switch 11 to MP-Switch 22, MP-Switch 22 to Node 22. (Traverses 3 switches)

PATH 2—Node 10 to MP-Switch 10, MP-Switch 10 to MP-Switch 22, MP-Switch 22 to Node 22. (Traverses 2 switches)

PATH 3—Node 10 to MP-Switch 10, MP-Switch 10 to MP-Switch 20, MP-Switch 20 to MP-Switch 32, MP-Switch 32 to to MP-Switch 22, MP-Switch 22 to Node 22. (Traverses 4 switches)

PATH 4—Node 10 to MP-Switch 10, MP-Switch 10 to MP-Switch 12, MP-Switch 12 to MP-Switch 22, MP-Switch 22 to Node 22. (Traverses 3 switches)

The first of the multipaths to establish connection between nodes 10 and 22 is the winning path, and the other 3 paths will be completely broken to leave the rest of the network idle for the purpose of supporting other connections while node 10 communicates to node 22 over the winning path. Note that the path length (the number of switch stages traversed to get from Node 10 to Node 22) can vary using the multipath method. This is a basic characteristic of the torus network; i.e., it is not an equidistant network and various nodes and various multipaths provides connections of different path lengths.

The preferred switching means is the basic digital asynchronous and unbuffeted switching concept disclosed in U.S. Ser. No. 07/677,543, "All-Node Switch, An Unclocked, Unbuffered Asynchronous Switching Apparatus" by H. T. Olnowich et al. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, Where n connections can be established or broken at the same time (where n=the number of elements of the system which are communicating via the switching network). Thus, the number of connections that can be made or broken simultaneously scales directly with the size of the system. This capability enables the invention apparatus to handle multiple shod messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network would have the characteristics for full parallel interconnection.

The preferred Torus MP-Switch embodiment uses only unidirectional interfaces, and therefore FIG. 2 shows the switch interface 5 to be comprised of two unidirectional sets of lines, one carrying data from node 10, and one carrying data from the switch network to node 10. Referring to FIG. 2, the preferred embodiment is a 5×5 switching apparatus 10, where the function of the present invention is to provide a means of connecting any of 5 sets of inputs on a mutually exclusive basis to any one of the unused 5 output ports. The 5×5 switching apparatus 10 can support up to 5 simultaneous connections at any given time. For instance, Input 1 could be connected to Output 3, Input 2 to Output 4, Input 3 to Output 2, and Input 4 to Output 1.

The invention switching apparatus 10 is unidirectional, which means that data flows in only one direction across the said switching apparatus 10, that being from input to output. Switching apparatus 10 interfaces are defined in detail in FIG. 1. The set of lines 31, 32, 33, 34, and 35 at each in-port to the switching apparatus 10 are identical in number and function to the set of lines 41, 42, 43, 44, and 45 at each out-port. The sets of interface lines to each input and output port contain twenty-one unique signals: 16 digital data lines, and 5 digital control lines (VALID, REJECT, ACCEPT, Path Control 0, and Path Control 1). The signals at each port are differentiated by a prefix of XIN- or XOUT- indicating the direction and number of the port (X) that they are associated with. The sixteen digital data, one VALID line, and 2 Path Control lines have a signal flow in the direction going from input to output across switching apparatus 10, while the digital REJECT and ACCEPT control lines have a signal flow in the opposite direction.

Figure 4:
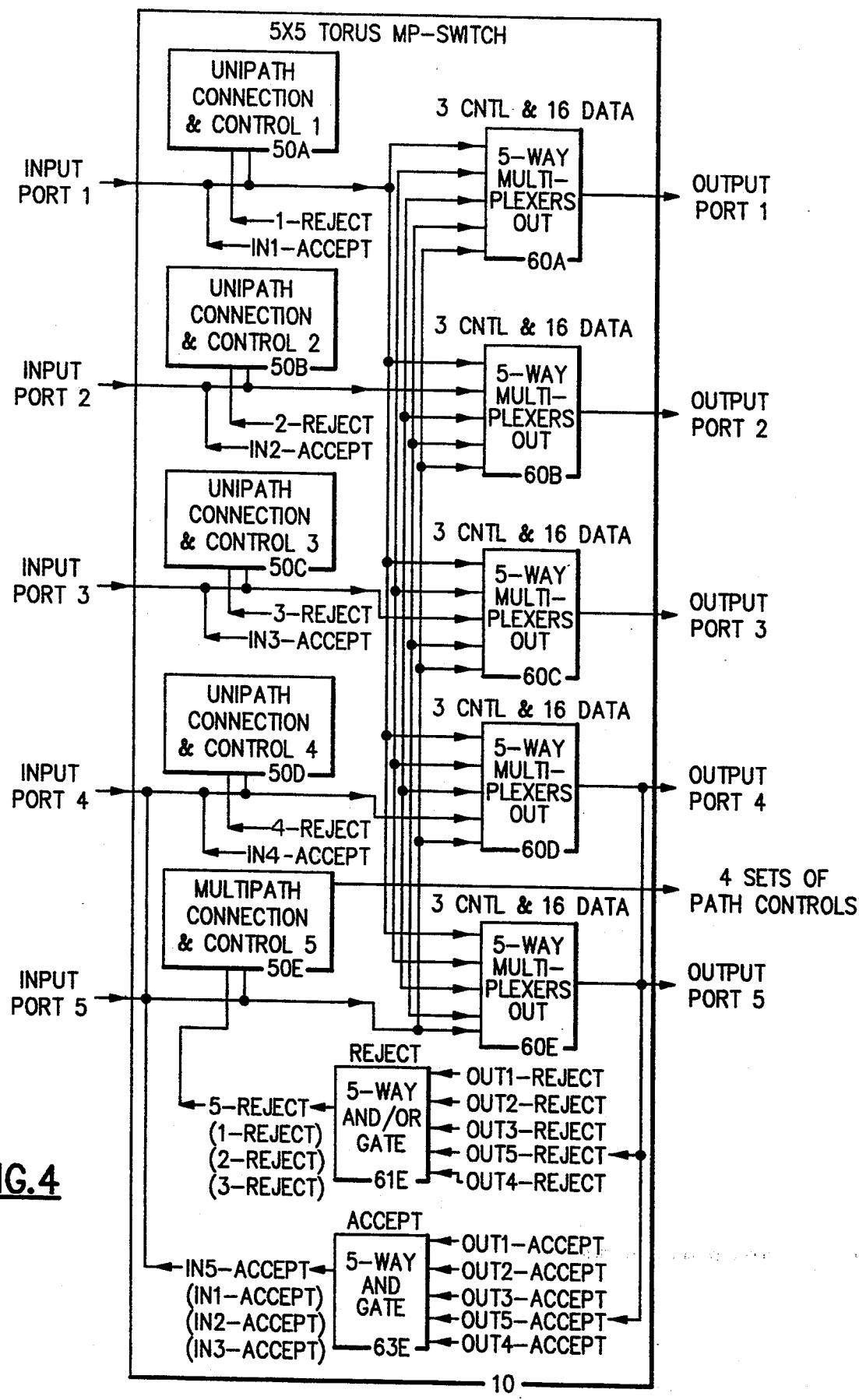
FIG. 4 shows a schematic block diagram of the simple digital data flow and control path implementations of the 5×5 torus switching apparatus, which has the capability of providing a fully parallel switching means for interconnecting up to ports simultaneously for the purpose of transferring digital data.

Referring to FIG. 4, a functional diagram of the simple data flow across switching apparatus 10 is illustrated. The 5 control and 16 data lines at each input port, inside the switch, and at each output port are represented by a single line in FIG. 4 for simplicity. For instance, the 5 control and 16 data lines entering switch 10 at IN PORT 1 go to six internal functional blocks of switching apparatus 10; these are blocks 50A, 60A, 60B, 60C, 60D, and 60E. Block 50A makes the decision as to which of the five possible output ports are to be connected to input port 1. The 5 control and 16 data lines from each input port go to each output multiplexer block (60A, 60B, 60C, 60D, and 60E); this makes it possible to connect any input port to any output port in normal mode. Each of the five output multiplexer blocks (60A, 60B, 60C, 60D, and 60E) is uniquely commanded from each of the control blocks (50A, 50B, 50C, 50D, and 50E) as to which of the five possible sets of in, put port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60E form connections to move the control and data signals across switch 10 with a unidirectional signal flow from input port to output port, AND/OR gate 61E and AND gate 63E form signal connections for the REJECT and ACCEPT signals, respectively, with a signal flow in the opposite direction of output port to input port (typical implementations are shown by blocks 61E and 63E—similar blocks are associated with each input port). These REJECT and ACCEPT signals provide a positive feedback indication to switch 10 of actions taken either by subsequent switch 10 stages or by the receiving node. A data message being transmitted through switching apparatus 10 over the 16 data signals can be REJECTed by any network stage if it is unable to establish the commanded connection or by the receiving node if it is not capable of receiving the message at this time or if it detects an error in the transmission. In normal mode block 61E functions as an OR gate, such that any single input to gate 61 indicating a Reject condition will propagate a reject signal to the output of gate 61E. The receiving node also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sending node on whether the attempted transmission was received correctly or rejected.

As illustrated by FIG. 4 the Torus MPoswitching apparatus; would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

Figure 5:
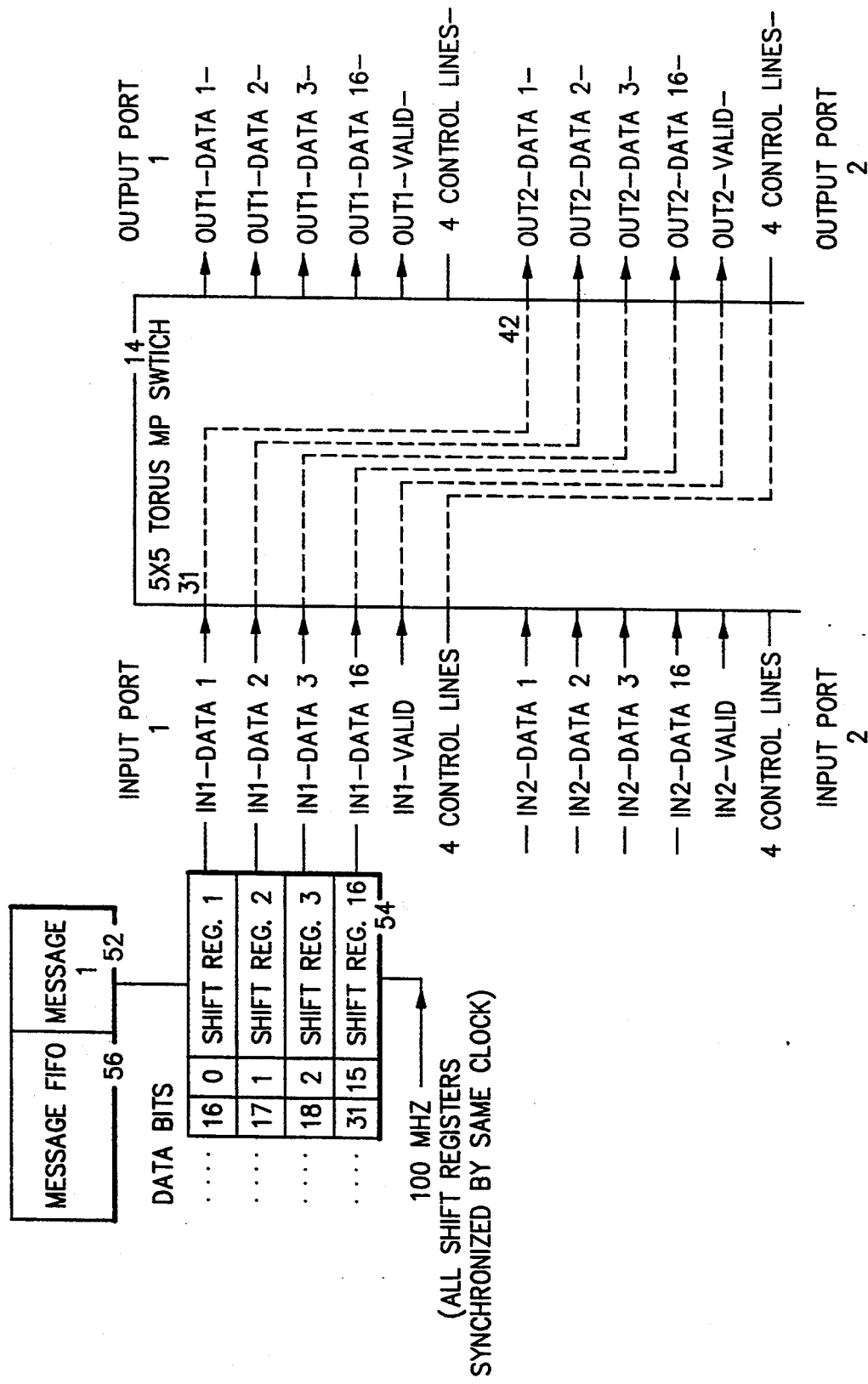
FIG. 5 illustrates a typical method for generating parallel control and and multiple line serial digital data information to be sent to the 5×5 embodiment of the invention switching apparatus over sixteen synchronous; data lines.

Referring to FIG. 5, blocks 56, 52, and 54 illustrate a typical method for generating multi-line (parallel)-/serial digital data in the form of a message which can be transmitted to and across switching apparatus 14, which is a partial drawing of the switching apparatus 10. Similar parallel/serial data generation logic as provided by 56, 52, and 54 can be used at each of the other input ports to switching apparatus 10. Each set of input data lines provides 16 serial data lines to a given input port which is synchronized to the same clock by the sixteen shift registers 54 which create the parallel/serial data by shifting 16 synchronized lines of data 31 as controlled by the same identical clocking signal (100 MHZ in FIG. 5). However, the five different input port sources (31, 32, 33, 34, and 35) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the 16 shift registers 54 by placing data bit 0 into the first bit of shift register 1, data bit 1 into the first bit of shift register 2, data bit 2 into the first bit of shift register 3, etc., data bit 15 into the first bit of shift register 16, data bit 16 into the second bit of shift register 1, etc. Shift registers 54 then begin to send serial data to switching apparatus 14 over 16 synchronized data lines, in such a manner that the parallel/serial data flows continuously until the entire message has been transmitted. The switch apparatus 14 uses the first five bits transmitted (in the first two clock cycles of serial data over interface 31 from serial registers 54 to switching apparatus 14) to select and establish a connection path through the switching apparatus 14. The example in FIG. 5 illustrates via dashed lines, the switching apparatus establishing a temporary connection between input port 1 (31) and output port 2 (42), such that each of the 21 individual lines in interface 31 are uniquely and directly connected to each of the corresponding lines in interface 42.

Figure 6:
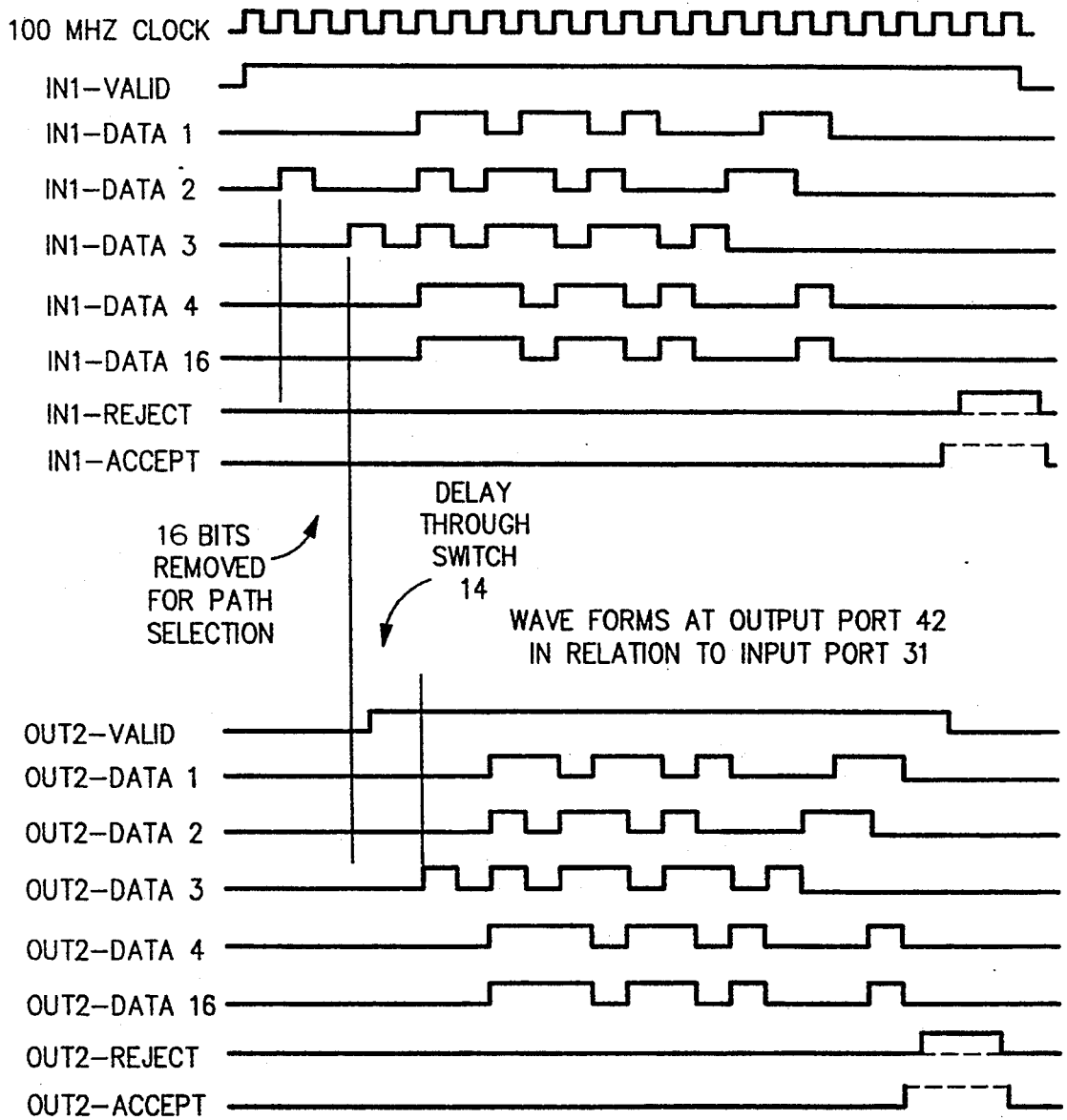
FIG. 6 shows a typical timing diagram for routing the digital interface signals arriving at one input port of the 5×5 embodiment of the, invention switching apparatus to one output port.

Referring to FIG. 6, typical serial waveforms are shown for both input and output ports of the switching apparatus 14. The switch removes the first 16 bits of the serial transmission (the switch uses only 5 of these bits) as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 16 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 16 bits.

The convention for indicating to a switch 14 input port over an interface (such as 31) that there is no transfer in progress, is to issue continuous IDLE commands, which are denoted by the 16 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 5 of the 16 data lines associated with each input port. Selection information must be transferred prior to the data, so that the commanded interconnections can be established and the data can then flow to the commanded destination. The selection information need NOT identify an input port number (1 to 5), because it is arriving at the switch over a specific input and the switch already knows what input number it is receiving data on. Therefore, the selection information need ONLY specify the number (1 to 5) of which one of the five output ports of switching apparatus 10 to which to connect. The method of path selection recommended here is one out of N encoding with a return to zero (called a DEAD FIELD).

Figure 7:
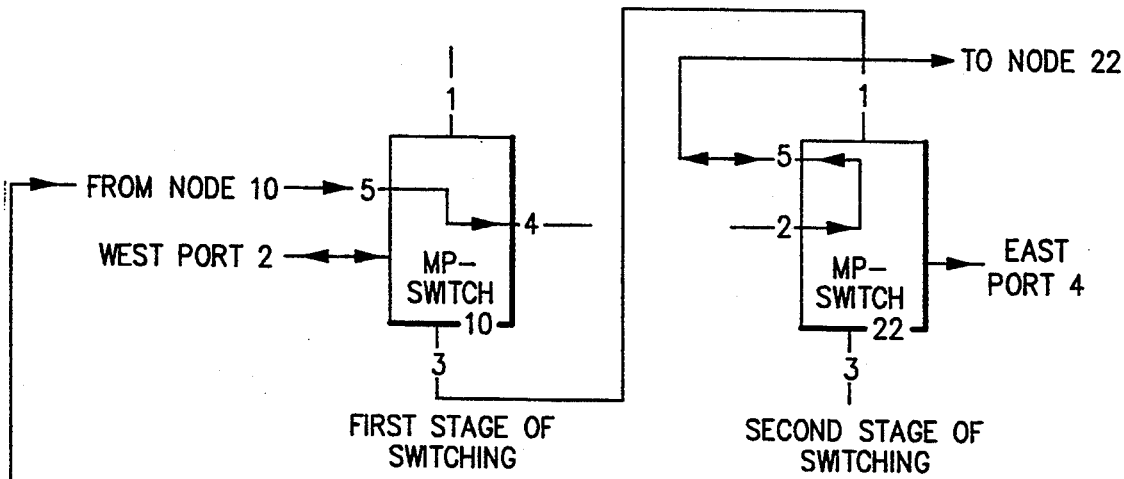
FIG. 7 illustrates the typical method of selecting and establishing a transmission path through a network comprised of the invention switching apparatus for the purpose of sending digital data from one node to another.

Referring to FIG. 7, a typical example of the exact serial bit patterns and control signal activation for the normal mode of switch operation is shown for sending control and digital data information to switching apparatus 10. The example references a path through the torus network shown in FIG. 3, and passing through two stages of switching elements. The example involves sending data across the network from node 10 through switching apparatuses 10 and 22 to node 22. To make this connection; input port 5, of switch 10 must be connected to output port 3 of the first stage switching apparatus 10, and input port 1 must be connected to output port 5 of the second stage switching apparatus 22. The signal sequence that is sent to input port 5 to cause the desired connections in switching apparatus 10 and 22 is shown in FIG. 7. In the signal sequence of 1's and 0's, time advances from left to right, so that the values seen at clock time −2 arrive at switch 10 first, and the values at clock time −1 arrive second, etc. The values of the 5IN-DATA and 5IN-VALID lines are all zeroes and cause nothing to happen at switch 10 during times −2 and −1, because they indicate IDLE. At clock time 0, the IN1-VALID line goes to a logical 1. This prepares switch 10 by enabling the input port 5 to receive data, but no connection or action takes place at switch 10 at this time. The 5IN-VALID control line basically enables the corresponding switch input port; when 5IN-VALID is a logical 0, switch 10 cannot make any connections or receive any data from input port 5, which is held RESET. Finally, at clock time 1, switch 10 receives its command as to what output port to connect to; the command is received entirely during clock time 1.

The command bit pattern sent at clock time; 1 is used by switch 10 to establish connection to an output port; this process is referred to as a path selection operation and takes place completely internal to switch 10, The path selection approach implemented by the present Torus MP-Switch invention is to let each of the first 5 5IN-DATA lines (1 to 5) define a unique output of switch 10 to be selected. For instance, 5IN-DATA1 signal going to a logical 1 at time 1 tells switch 10 to connect to output port 1, 5IN-DATA2 commands connection to output port 2, etc. In our example, since 5IN-DATA3 goes to a logical 1 during clock time 1, switch 10 is thereby commanded to connect to output port 3. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 4 data lines must be 0's. Note that since 1 bit of selection information is guaranteed to be a logical 1, switch 10 will be able to recognize the start of a transmission without requiring any additional bits to signify that a transfer is commencing. The switch 10 makes the commanded connection by removing the 16 bits from the data lines and storing 5 of them in a selection register in control block 50A of FIG. 4. The other 11 bits are not used for selection and they are destroyed. The 16 bits transmitted during clock time 1 are not passed through switch 10 to switch 22, but instead switch 10 begins passing the very next 16 bits of data corresponding to clock time 2 to the next switch 22. However, the; information bits following a selection command (those transmitted by the 16 data lines at clock time 2 in our example) must always be all zeroes (a DEAD FIELD) as shown in FIG. 7. The purpose of this will be explained subsequently.

At clock time 2, the connection of switch 10 input port 5 to output port 3 is established and causes the signal sequence at clock time 2 to be transmitted across switch 10 and the interconnecting wires to switch 22 input port 1. From this time on, switch 10 merely transmits all subsequent data immediately to switch 22 input port 1; it never examines or takes any action on any other data patterns presented to switch 10 over its input port 5 interface. It just passes all data patterns it receives over input port 5 immediately to the output port 3 and switch 22. Thus, at clock time 2, assuming zero delay across switch 10 and its associated cable, switch 22 input port 1 sees the VALID signal rise and the all zeroes DEAD FIELD on the 16 data lines coming into switch 10 input port 5. In this way, at time 2, switch 22 input port 1 is enabled in an identical manner to the way switch 10 input port 5 was enabled previously at time 0.

In our example, 5IN-DATA5 goes to a logical 1 during clock time 3 and switch 22 is thereby commanded to connect its input port 1 to its output port 5, in a manner similar to the way switch 10 was commanded to connect its input port 5 to its output 3 during clock time 1. The switch 22 in making the commanded connection, removes the 16 bits at clock time 3 from the data lines, and stores five of them in the selection register which is pad of control block 50A of FIG. 4. The bits transmitted during clock time 3 are not passed through switch 22 to Node 22, but instead switch 22 begins passing the very next 16 bits of data corresponding to clock time 4 to Node 22. However, the information bits following a selection command (those transmitted by the 16 data lines at clock time 4 in our example) must always be all zeroes (a DEAD FIELD) as shown in FIG. 7. Thus, by clock time 4, switches 10 and 22 have established a connection path for transferring data directly from Node 10 to Node 22. Up to clock time 5, Node 22 sees nothing but IDLE commands. At time 4, Node 22 sees the 5OUT-VALID line from switch 22 go active and is thereby enabled to start receiving data at time 5. From time 5 on, Node 22 can receive data from Node 10 over the 16 5OUT-DATA lines from switch 22. The protocol of the actual data being transmitted can be any of the normal formats such as manchester encoded, 8/10 bit encoding with preamble, etc. However, the preferred embodiment, as shown in FIG. 7 is an all ones synchronization field at time 5, followed by the NRZ data message. The data message can specify the word count length of the transfer. The purpose of the synchronization field of all ones as a prefix to the actual data message, is to enable the receiving node 22 to synchronize to the sending node 10 in one clock time. This assumes that the two nodes involved in the data transfer have clocking systems that are asynchronous to each other, but are operating at the same frequency within a specified tolerance.

The preferred embodiment is to transmit the word count length of the message first in the message header which is transmitted during clock time 6 and clock time 7. Node 22 then decrements the length count and can detect when the transfer is complete. Node 22 can then check the message for accuracy using the selected error detection method (parity, ECC, or CRC). If the message has been received correctly, Node 22 responds by activating the ACCEPT interface line back to switch 22 at clock times n+1 and n+2. Switch 22 passes the ACCEPT indication back to switch 10, which in turn returns it immediately to Node 10. This indicates to Node 10 that the transfer completed successfully, and Node 10 resets its VALID and 16 data lines to switch 10 to zeroes, thus, completing the data transfer and returning to the IDLE state. The 5IN-VALID input line to switch 10 going to a zero at time n+3, causes switch 10 input port 5 to break its connection to output port 3 and to return to the IDLE state. Immediately, switch 22 sees its 1IN-VALID input line go to a zero, breaks its connection to output port 5 and returns to the IDLE state. Thus, the connections can be broken and the switches returned to IDLE in as little as one clock time. If Node 10 has another message to transmit, it can load the next message into buffer 52 and shift registers 54 (FIG. 5), and begin transmission to Node 22 or any other node as soon as time n+4. The only restriction is that the VALID signal generated by Node 10 must return to zero for a minimum of one clock time (time n+3) to signify the end of one transfer before beginning another.

If Node 22 finds an error in the message it has received after the word count has gone to zero at clock time n, it responds by activating the REJECT interface line (instead of ACCEPT) back to switch 22. Switch 22 uses the incoming REJECT signal from Node 22 to break its ,connection to Node, 22, to return to the IDLE state, and to pass the REJECT indication back to switch 10, which in turn returns it immediately to Node 10 after breaking its connections and returning to IDLE. Node 10 then notes that the transfer has been rejected, and returns to the IDLE state by resetting its VALID and 16 data lines to switch 10 to zeroes. Node 10 may then retry the transmission by reloading shift registers 54 from buffer 52 and starting the transmission over again from the very beginning (clock time −1). The retransmission can occur over the identical path as the previously rejected transmission, or if multipaths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which t he switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 7, if switch 10 had received a command at clock time −2 to connect input port 2 to output port 3, that connection would have been active when input port 5 requested to be connected to output port 3 at clock time 1. In this case, output port 3 is BUSY at clock time 1 and switch 10 would activate the 5IN-REJECT line to Node 10. As described above, the transmitter may retry any REJECTed message.

Likewise, the connection could be made successfully at switch 10, yet output port 5 of switch 22 could be BUSY at clock time 3, causing switch 22 to issue the REJECT signal to switch 10. This, in turn, causes switch 10 to return REJECT immediately to Node 10 after breaking its connections and returning to IDLE.

2) Simultaneous CONTENTION—Rather than input port 2 establishing a connection to output port 3 in switch 10 at clock time −2 as described above (in advance of the same command from input port 5 at clock time 1), it is possible for two or more input ports to try to connect to the same output port at approximately the same time. This is called CONTENTION for an available output port. For instance, suppose input ports 5 and 3 both sent simultaneous commands at clock time 1 requesting to be connected to output port 4. The present invention resolves this contention by first connecting both contending input ports 5 and 3 to output port 4. The net effect is to electrically connect the 2 input ports to output port 4, which will logically OR the signals coming from both sources. During clock time 2 the logical OR of the input ports will NOT cause an error, because the values present on both input ports 5 and 3 are identical: the VALID lines for each arc logical 1's and the data lines for each contain the DEAD FIELD (logical 0's). However, at clock time 3, the signals from each source could be different and an error could be caused if the 2 input ports both remained connected at clock time 3 and later. In other words, switch 10 has 1 cycle time (clock time 2) to correct the decision it made to connect two or more inputs to the same output. Switch 10 makes this correction during dock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 5 gets the connection only if no other input port wants it. Applying the priority selection to our example, input port 3 gets to keep its connection to output port 4, while the connection of input port 5 to output port 4 is reset during clock time 2. This results in the REJECT signal being issued in the normal fashion from switch 10 to input port 5.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 16 data lines carrying serial selection data to the cascaded switches. Both the rise and fall of data bits commanding the switches to make connections gives the unclocked switch two clock edges (rise and fall) on which it can trigger and make decisions. These are the only two decision making times available to switch 10.

The parallel system, shown in FIG. 2, sends messages over a multi-stage network comprised of three components—Message Header, Message Data, and Cyclic Redundancy Code (CRC) words. The CRC words are used to check both the header and data portions of the message. For simplicity in this description, the header will be assumed to be 4 words including a one word count field which defines the number of words in the message including the 4 header words and all the data words—but not the CRC words. In addition, the data will be assumed to be transmitted in multiples of 2 words—this is only for this example and ease of description—the invention requires no such restriction.

In the normal switch mode only a single path is commanded to any destination node, and the Path Control signals are not used. The sending node (the port 5 input logic) places zeroes on 11 of the Data bits that are not used in the stage selection fields, as shown in FIG. 7. In this case, the first 5 data bits (00 to 04) can be used to route any input port to any of 5 output ports, and selecting oneself as a destination for testing purposes becomes possible. Referring to FIG. 1, this normal mode of operation is commanded when the MULTIPATH input to switch 10 is inactive. If the MULTIPATH input is active, switch 10 will change the normal operation of the switch to multipath mode.

Turning now to the alternative embodiment of multipath mode, FIG. 8 shows the details of how node 10 performs the routing function in such a manner as to enable 4 different routes to be tried simultaneously. Block 10 is a typical diagram of the 5×5×16 torus switch showing its normal network connections as shown typically in FIG. 3. In multipath mode, switch 10 only has 4 connection options, instead of five as in the normal mode. A message can be received from any of the 5 inputs to the switch and has the option of being connected to any of the other 4 output ports of the switch; i.e., a switch input port cannot be connected back to its own output port in a wrap fashion. For instance, FIG. 8 shows that Input port 5 sending a message into switch 10 has the option of being connected to any or all the output ports labelled 1 to 4. The data lines arriving into input port 5 are used to transmit routing information as the first pad of every message. The first 16-bit data transmittals to Switch 10 contain routing information. Each 16 bit routing control word is subdivided into 4 sections as follows and each section is used to contol 1 of 4 multipaths:

| MULTIPATH 1 Control | MULTIPATH 2 Control | MULTIPATH 3 Control | MULTIPATH 4 Control |
|---|---|---|---|
| 00 01 02 03 | 04 05 06 07 | 08 09 10 11 | 12 13 14 15 |

Data Bit #

Each section above contains 4 bits. Since any input to the switch 10 has only 4 routing possibilitities to choose from, the routing selection is very simple—one bit in each section is defined as a routing control to one of the 4 possible selections. If the routing bit=1, the routing is enabled. If the routing bit=0, the routing selection is not made. In a non-multicast example, such as FIG. 3, only 1 of the 4 bits in each section will be a 1—thus uniquely defining the connection to be made by switch 10. A detailed example of how this works is shown in the bottom pad of FIG. 8. The stage selections columns shown are in relation to individual switch components—for instance the stage 1 selections all take place in MP-Switch 10 as it is the first switch stage encountered by node 10 as it attempts to connect to node 22; each of the 4 multipaths take a different output port from switch 10. The 16-bit routing control word sent from node 10 to MP-Switch 10 attempts to set up 4 simultaneous multipaths as shown under the stage 1 selections column. Data bit 00 being the bit=1 in the section defined by Data bits 00 to 03, selects output port 1 of MP-SWITCH 10 and forms a connection to MP-Switch 11. Data bit 06 being the bit=1 in the section defined by Data bits 04 to 07, selects output port 3 of MP-SWITCH 10 and forms a connection to MP-Switch 22. Data bit 09 being=1 in the section defined by Data bits 08 to 11, selects output port 2 of MP-SWITCH 10 and forms a connection to IVIP-Switch 20. Data bit 15 being=1 in the section defined by. Data bits 12 to 15, selects output port 4 of MP-SWITCH 10 and forms a connection to MP-Switch 12. If all 4 bits of a section are set to zero, no connection is made to any output path for that associated multipath. Thus, node 10 can select 1, 2, 3, or 4 multipaths based on the bit patterns it sends to MP-Switch 10.

Port 5 of every MP-Switch is connected to the associated node and functions with a slight variation from the 4 other switch ports which connect only to other switches. The variation in input port 5 control is shown by block 50E of FIG. 4, which indicates that input port 5 uses multipath connection and control block 50E, whereas the other input ports use unipath connection and control blocks 50A to 50D. All blocks 50A to 50E contain 5 sets of control logic, each being capable of connecting the associated port's 21 interlace signals to any of 5 switch output ports. The unipath blocks 50A to 50D can only connect to one output port at a time; however, the multipath block 50E can connect to 4 output ports at a time, such that input port 5 can be commanded simultaneously to connect to multiplexers 60A to 60D—each being a different multipath. In this case block 61E acts as an AND gate, requiring that all 4 OUT-Rejects from output ports 1 to 4 must be active simultaneously to cause input port 5 to sense a reject condition. The other blocks 61A to 61D always function as OR gates, where any single reject condition will be sensed as a reject.

Input Port 5 of the MP-Switch disregards the Path Control 0 & 1 input signals (shown by X in the Stage 1 Selections column of FIG. 8). Instead, Port 5 generates from block 50E the Path Control signals uniquely to the 4 output ports to which it routes the subsequent routing control word.,; and message data. For instance, MP-Switch 10 sets and maintains the 4 output sets of Path Control signals to different values depending upon the multipath associated with each output port. For instance, MP-Switch 10 sets the Path Control bits to 00 to output port 1. This defines to subsequent stages of switch in that path that they are only to form connections based on the Multipath 1 routing control bits (Data bits 00 to 03), and that they are to ignore the other bits set in the routing control words. Likewise, MP-Switch 10 sets the Path Control bits to 01 to output port 3. This defines to subsequent stages of switch in that path that they are only to form connections based on the Multipath 2 routing control bits (Data bits 04 to 08), and that they are to ignore the other bits set in the routing control words. Etc. Also, every switch stage uses and destroys one 16-bit routing control word as it makes its commanded connection. The sending node (10 in our example) transmits one, routing control word for every stage in the longest path of the connection that it is trying to establish. In our example, 4 routing control words are sent, since Multipath 3 traverses 4 stages of switch. The second routing word passes through MP-Switch 10 which sends identical copies across 4 multipaths simultaneously. For instance, the second routing word goes across Multi-path 1 along with the Path Control bits set to 00, as shown under the Stage 2 selection column, to inform MP-Switch 11 that it is to deal only with Data bits 00 to 03 of the 16 bit routing word it is receiving. MP-Switch 11 detects that Data bit 01 is set in its routing control word and forms a connection to output port 2 based on Data bit 01 being set, which connects MP-Switch 11 to MP-Switch 22. Likewise, the second routing control word is sent out the other three MP-Switch 10 output ports, simultaneously, and commands the other Stage 2 connections shown in FIG. 8 for the three other multipaths. Returning to Multipath 1, the next subsequent switch stage is commanded by the third routing word. The third routing word travels along all the multipaths and traverses Multipath 1 in conjunction with the Path Control bits 00, as shown under the Stage 3 selection column, to inform MP-Switch 22 that it is to deal only with Data bits 00 to 03 of the 16 bit word it is receiving. MP-Switch 22 detects that Data bit 01 is set in its routing control word and forms a connection to output port 5 to Node 22 based on Data Bits 00 to 03. This occurs because switch 22 has been commanded to connect to itself, and connection to oneself is not legal, but instead self-connection commands always cause a connection to output port 5. Once a multipath has reached its destination (node 22 in our example), any subsequent selection stages will contain all zeroes in the selected bit field—for example, Data Bits 00 to 03 in the Stage 4 Selections column. The receiving node 22 will not start to receive a message until after it receives a sync word having all 16 bits=1 to signify the start of a message. Likewise, as shown in FIG. 8, Multipaths 2 to 4, perform operations of making connections based on the 4-bit sections of the routing control words that they are commanded to monitor via the Path Control 0 & 1 signals. Thus, each multipath monitors and responds to a different set of 4 bits in the control routing words and simultaneously try to establish 4 different paths to the destination node. However, at most one of these paths will be successful. The others, whether blocked by other connections in the network or by a multipath connections established by the same operation that arrived first or won the contention decision at the MP-Switch 22, are responded to with the REJECT signal to indicate that the path was not successful. If two or more selections arrive simultaneously at the same switch for the purpose of establishing connections, to the same output port, one of the contenders will win the connection and the others will be rejected. REJECT breaks down any connections in a multipath that was not successfully completed, except for the initial connection from sending node 10 to MP-Switch 10. Port 1 is handled differently in this respect, and only receives a REJECT indication if all multipath attempts are rejected, indicating that no paths are available at this time and that a retry must occur later.

The sending node 10 assembles routing control words in software once at the beginning of every task based on the network topology. It stores these multipath routing control words in software look-up tables and places these words as the first pad of any message transmission. It is possible to use hardware tables or routing caches to relieve the software of the task of appending the routing information for every message transmittal.

The routing performed inside every MP-Switch is extremely simple because all the work has been done in advance in the sending node based on look-up tables. The sending node transmits 16-bit routing control words separated from each other by an all zeroes DEAD Field word which handles data skew problems and permits a dead time at every switch stage to allow for asynchronous contention resolution at each stage of the network. The time required to establish a connection at each switch stage is the time required to process the routing control word plus the DEAD Field—each of these are processed extremely fast by the MP-Switch in 1 clock time at the speed of the transmission clock that is sending 16-bit words sequentally to the network. For the preferred embodiment a 50 MHZ clock is used, which means that a connection is established at each switch stage in 40 ns.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A torus switching network comprising:
   a plurality of bufferless and clockless switching apparatuses, said switching apparatuses each including a plurality of duplex ports, each of said duplex ports including a switch input port and a switch output port, said switching apparatuses each having one of its duplex ports coupled to one of a plurality of network nodes and a remainder of its duplex ports each coupled to a duplex port of another of said switching apparatuses, each of said network nodes comprising means for receiving a data message from a coupled switching apparatus and means for sending a data message to the coupled switching apparatus, said data message to the coupled switching apparatus including a path connection request; said switching apparatuses each further including:
   connection means for establishing a connection between any pair of the network nodes in response to said path connection request received at a switching apparatus coupled to one of said pair of the network nodes, said connection for transmitting a data message from said one of said pair of the network nodes to the ,other of said pair of the network nodes, said connection means including asynchronous connection means for establishing asynchronously a plurality of simultaneously active connections between each of a plurality of pairs of the network nodes in response to a plurality of path connection requests received separately or simultaneously at said switching apparatuses, said simultaneously active connections each for transmitting a data message from one network node of each of said plurality of pairs to the other network node of said each of said plurality of pairs.

2. The switching network according to claim 1, wherein said path connection request includes a multipath connection request and said connection means further includes:
   multipath means for establishing said connection between any pair of the network nodes by transmitting copies of said data message over each of said plurality of duplex ports in response to said multipath connection request received at a switching apparatus coupled to one of said pair of the network nodes for transmitting a data message from said one of said pair of the network nodes to the other of said pair of the network nodes, said copies of said data message each traversing a separate path from said one of said pair of the network nodes to the other of said pair of the network nodes; and
   means for the first of said copies of said data message to reach the other of said pair of the network nodes to trigger the cancellation from the switching network of remaining copies of said data message.

3. The switching network according to claim 2, wherein said switch input ports and switch output ports comprise a plurality of parallel data lines and a plurality of control lines, one of said control lines for signalling back to one of a pair of network nodes transmitting a data message that the data message was successfully received by the other of said pair of network nodes, a second of said control lines for signalling back to said one of a pair of network nodes transmitting a data message that the data message was not successfully received by the other of said pair of network nodes.

4. The switching network according to claim 3, wherein said data lines transmit said data message via parallel N bit wide data paths, wherein N is the number of said plurality of data lines.

5. The switching network according to claim 4, wherein said path connection request includes dead fields, said dead fields each comprising an N bit wide transmission of logical zeroes.

6. The switching network according to claim 4, wherein said multipath connection request includes connection information for each of said copies of said data message for establishing each said separate path from said one of said pair of the network nodes to the other of Said pair of the network nodes.

7. The switching network according to claim 3, wherein said signalling back to said one of a pair of network nodes transmitting a data message that the data message was not successfully received by the other of said pair of network nodes is caused by a path connection request for the data message requesting a connection to a blocked switch output port.

8. The switching network according to claim 3, further comprising priority means for determining priority between two path connection requests requesting a same switch output port, and wherein said signalling back to said one of a pair of network nodes transmitting a data message that the data message was not successfully received by the other of said pair of network nodes is caused by a path connection request for the data message being determined by the priority means to not have a highest priority.

9. The switching network according to claim 3, further comprising:
appending means for appending to the data message cyclic redundancy codes;
code regeneration means for regenerating said cyclic redundancy codes from a data message received by the other of said pair of network nodes; and
comparing means for comparing appended and regenerated cyclic redundancy codes, and wherein said signalling back to said one of a pair of network nodes transmitting a data message that the data message was successfully or not successfully received by the other of said pair of network nodes is caused by the comparing means indicating a positive or negative compare, respectively.

\* \* \* \* \*